United States Patent
Gomez et al.

(10) Patent No.: US 12,503,953 B2
(45) Date of Patent: Dec. 23, 2025

(54) CERAMIC MATRIX COMPOSITE COMPONENT WITH COATING

(71) Applicant: RTX CORPORATION, Farmington, CT (US)

(72) Inventors: Juan Gomez, El Paso, TX (US); Nizar Zahed, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/440,566

(22) Filed: Feb. 13, 2024

(65) Prior Publication Data

US 2025/0257666 A1    Aug. 14, 2025

(51) Int. Cl.
*F01D 11/12*    (2006.01)

(52) U.S. Cl.
CPC ........ F01D 11/122 (2013.01); *F05D 2230/90* (2013.01); *F05D 2240/55* (2013.01); *F05D 2300/611* (2013.01)

(58) Field of Classification Search
CPC .......... F01D 11/12; F01D 11/122; C23C 4/04; C23C 4/06; C23C 4/11; C23C 4/12; C23C 4/123; C23C 4/129; F05D 2300/11; F05D 2300/17–182; F05D 2300/611; F05D 2240/55
See application file for complete search history.

(56) References Cited

U.S. PATENT DOCUMENTS

| | | | |
|---|---|---|---|
| 8,475,945 B2 * | 7/2013 | Schmidt | C23C 28/044 428/697 |
| 10,065,243 B2 * | 9/2018 | Strock | B22F 5/04 |
| 10,822,951 B2 * | 11/2020 | Hazel | C23C 4/11 |
| 10,871,078 B2 * | 12/2020 | Ndamka | C23C 28/044 |
| 11,827,986 B2 | 11/2023 | Landwehr et al. | |
| 11,866,379 B2 * | 1/2024 | Liu | C04B 41/87 |
| 11,920,478 B2 * | 3/2024 | Strock | C23C 24/00 |
| 11,952,902 B2 * | 4/2024 | Jackson | F01D 11/122 |
| 12,188,365 B1 | 1/2025 | Thomas et al. | |
| 2015/0354394 A1 | 12/2015 | Leblanc, I | |
| 2019/0360351 A1 * | 11/2019 | Walston | F01D 11/122 |
| 2020/0055789 A1 * | 2/2020 | Smyth | C04B 41/4543 |
| 2020/0080430 A1 | 3/2020 | Schmidt et al. | |
| 2021/0108533 A1 | 4/2021 | Shi et al. | |

(Continued)

FOREIGN PATENT DOCUMENTS

| | | |
|---|---|---|
| FR | 3044702 | 6/2017 |
| FR | 3100048 | 2/2021 |

OTHER PUBLICATIONS

Extended European Search Report for Application No. EP25157251 dated May 2, 2025.

*Primary Examiner* — Brian P Wolcott

(74) *Attorney, Agent, or Firm* — Carlson, Gaskey & Olds, P.C.

(57) ABSTRACT

A blade outer air seal includes a center web having a radially inner face and a radially outer face, at least one mounting arm extending from the radially outer face, and a coating disposed on the radially inner face. The coating includes an environmental barrier coating layer and an abradable layer disposed on the environmental barrier layer. The abradable layer has a porosity of between about 15 percent and about 40 percent. A gas turbine engine and a method of protecting a blade outer air seal are also disclosed.

20 Claims, 2 Drawing Sheets

(56) References Cited

U.S. PATENT DOCUMENTS

| | | |
|---|---|---|
| 2021/0277792 A1 | 9/2021 | Strock |
| 2021/0355838 A1* | 11/2021 | Strock ................. C23C 28/3215 |
| 2022/0048828 A1* | 2/2022 | Liu ........................ F01D 5/284 |
| 2022/0106888 A1 | 4/2022 | Shi et al. |

* cited by examiner

CERAMIC MATRIX COMPOSITE COMPONENT WITH COATING

BACKGROUND OF THE INVENTION

This application relates to the use of coatings on a blade outer air seal.

Gas turbine engines typically include a fan delivering air into a bypass duct as propulsion air, and into a core engine. The core engine air moves into a compressor section where it is compressed and delivered into a combustor. The air is mixed with fuel and ignited in the combustor and passed downstream over turbine rotors driving them to rotate. The turbine rotors in turn rotate the fan and compressor rotors.

Improving the efficiency of gas turbine engines is important. To maximize the energy extraction from the volume of the products of combustion passing through the turbine rotors, a blade outer air seal ("BOAS") is placed radially outwardly of turbine blades to minimize blade tip clearance and block the flow of products of combustion from avoiding the turbine blades.

There is a need for BOAS coating with improved temperature and environmental resistance and improved rub performance for use in the operating conditions in a gas turbine engine.

SUMMARY OF THE INVENTION

A blade outer air seal according to an exemplary embodiment of this disclosure, among other possible things includes a center web having a radially inner face and a radially outer face, at least one mounting arm extending from the radially outer face, and a coating disposed on the radially inner face. The coating includes an environmental barrier coating layer and an abradable layer disposed on the environmental barrier layer. The abradable layer has a porosity of between about 15 percent and about 40 percent.

In a further example of the foregoing, a porosity of the environmental barrier coating layer is less than about 5 percent.

In a further example of any of the foregoing, the blade outer air seal includes a bond coat between the environmental barrier coating layer and the radially inner face.

In a further example of any of the foregoing, the environmental barrier coating is nonreactive with respect to calcia-magnesia-alumino-silicate (CMAS).

In a further example of any of the foregoing, the environmental barrier coating layer includes at least one refractory metal oxide.

In a further example of any of the foregoing, the refractory metal oxide is at least one of HfSiO4 and ZrSiO4.

In a further example of any of the foregoing, the abradable component comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

In a further example of any of the foregoing, pores of the abradable coating are configured to receive molten calcia-magnesia-alumino-silicate (CMAS).

A gas turbine engine according to an exemplary embodiment of this disclosure, among other possible things includes a turbine section arranged along a central engine axis. The turbine section has a turbine with at least one blade rotatable around the central engine axis. The at least one blade has a tip. The gas turbine engine also includes at least one blade outer air seal arranged radially outward from the tip and attached to an engine static structure. The blade outer air seal includes a center web having a radially inner face and a radially outer face, at least one mounting arm extending from the radially outer face, and a coating disposed on the radially inner face. The coating includes an environmental barrier coating layer and an abradable layer disposed on the environmental barrier layer. The abradable layer has pores and calcia-magnesia-alumino-silicate (CMAS) is disposed in at least some of the pores.

In a further example of the foregoing, the gas turbine engine includes a bond coat between the environmental barrier coating layer and the radially inner face.

In a further example of any of the foregoing, the environmental barrier coating is nonreactive with respect to calcia-magnesia-alumino-silicate (CMAS).

In a further example of any of the foregoing, the environmental barrier coating layer includes at least one refractory metal oxide.

In a further example of any of the foregoing, the refractory metal oxide is at least one of HfSiO4 and ZrSiO4.

In a further example of any of the foregoing, the abradable layer comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

In a further example of any of the foregoing, the tip of the blade includes an abrasive coating.

A method of protecting a blade outer air seal according to an exemplary embodiment of this disclosure, among other possible things includes on a radially inner face of a blade outer air seal, applying a coating. The coating includes an environmental barrier coating layer and an abradable layer. The abradable layer has a porosity of between about 15 percent and about 40 percent. Pores of the abradable layer are configured to receive molten calcia-magnesia-alumino-silicate (CMAS).

In a further example of the foregoing, the environmental barrier coating is nonreactive with respect to calcia-magnesia-alumino-silicate (CMAS).

In a further example of any of the foregoing, the environmental barrier coating layer includes at least one refractory metal oxide.

In a further example of any of the foregoing, the refractory metal oxide is at least one of HfSiO4 and ZrSiO4.

In a further example of any of the foregoing, the abradable layer comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
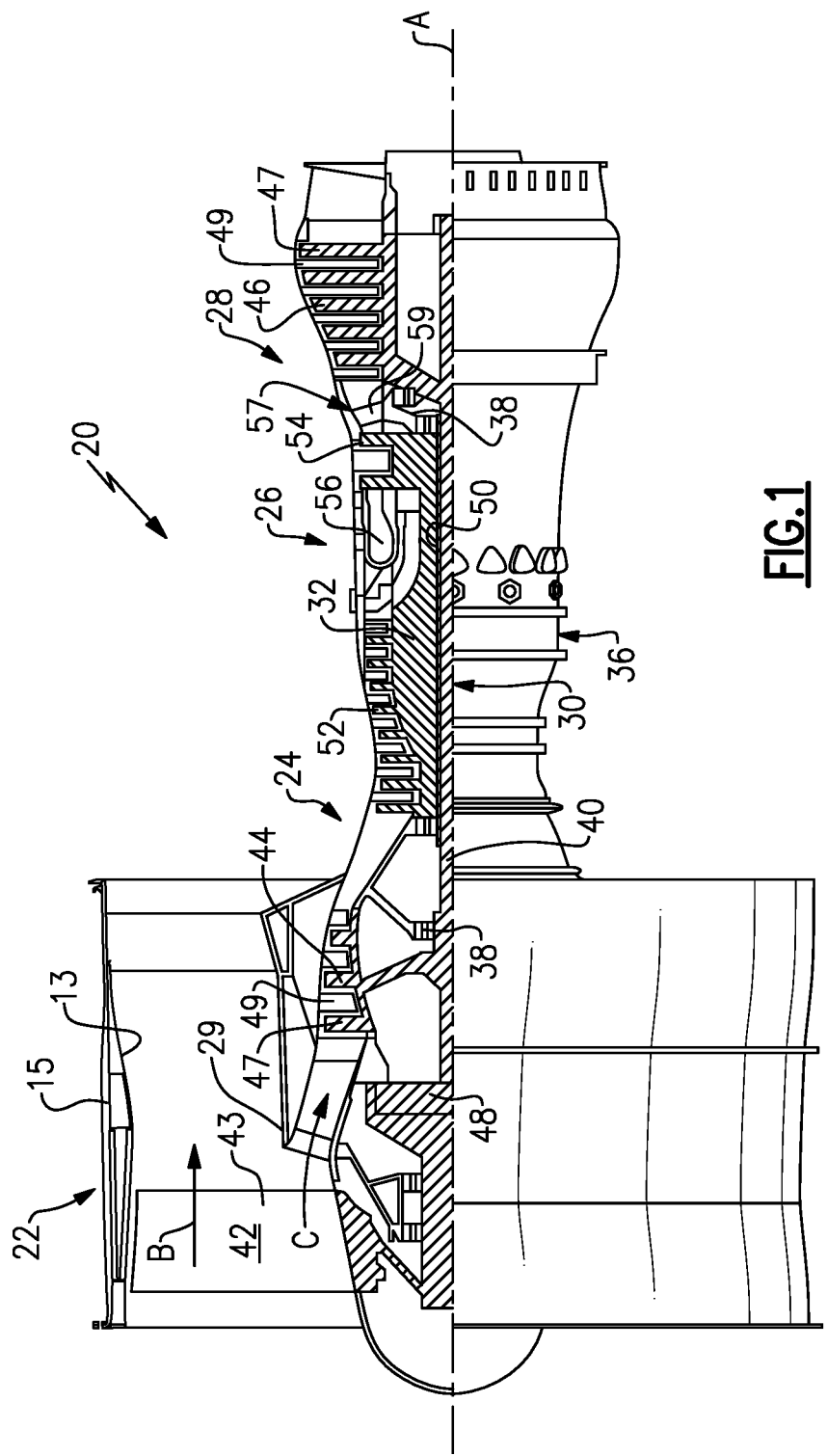
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram° R)/(518.7° R]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
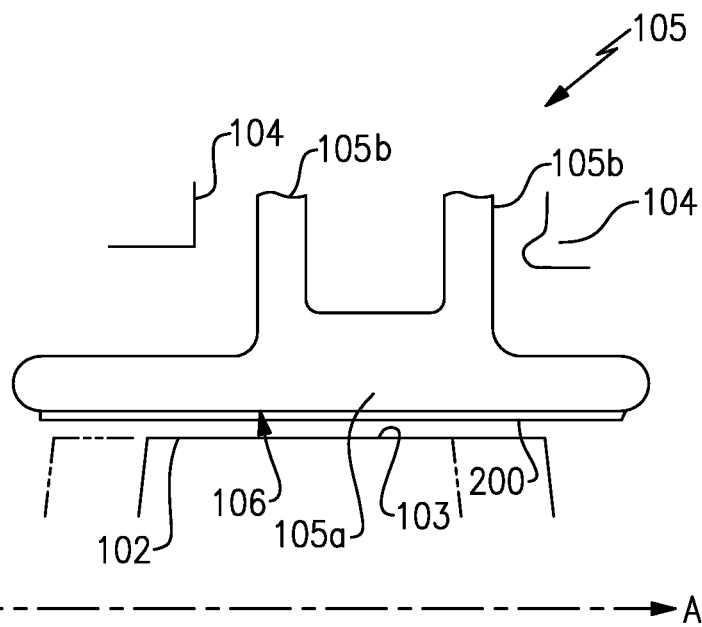
FIG. 2 shows a turbine section of the gas turbine engine of FIG. 1.

FIG. 2 shows a turbine section 28 having rotating turbine blades 102 with a radially outer tip 103. A vane is positioned upstream of the turbine blade 102. In one example the turbine blade 102 is a blade of the high pressure turbine 54 (FIG. 1). A blade outer air seal (BOAS) 105 is positioned radially outwardly of the tip 103 with respect to a central engine axis. A plurality of BOAS (not shown) are arranged circumferentially round the central engine axis. The BOAS 105 has a center web 105a and mounting arms 105b extending from the center web for mounting the BOAS to the engine 20 static structure. The center web 105a has a radially inner face 106 (where "radially inner" is in reference to the central engine axis A) and a radially outer face from which the mounting arms 105b extend.

In one example, the BOAS 105 is formed out of ceramic matrix composite materials ("CMCs") or a monolithic ceramic. A CMC material is comprised of one or more ceramic reinforcement plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcements and is formed of a single material. Example monolithic ceramics include silicon-containing ceramics, such as silicon carbide (SiC) or silicon nitride (Si3N4).

The radially inner face 106 may sometimes rub against the blade 102 tip 103 while the engine 20 is operating. Accordingly, many BOAS 105 include an abradable coating on the radially inner face 106 to accommodate the rubbing. In some examples the tip 103 includes an abrasive coating that couples with the abradable coating on the BOAS 105.

In general, there is a direct relationship between the porosity of a coating and how abradable it is. That is, a coating with a higher porosity will be more abradable. More abradable coating provide an improved abrasion couple in the case of tip 103 rub against the BOAS 105. However, highly abradable coatings are susceptible to environmental attack, which is a particular concern for the BOAS 105 which is exposed to hot combustion gases during operation of the engine 20. Of particular concern is attack by calcia-magnesia-alumino-silicate (CMAS), which can build up on the BOAS 105 in a molten state and infiltrate the pores of the abradable coating and accelerate failure of the coating by introducing unwanted localized mechanical stresses into the material. Moreover, CMAS is known to undergo a process of reactive crystallization which can produce unwanted reaction products that can also limit the lifespan of the coating.

Figure 3:
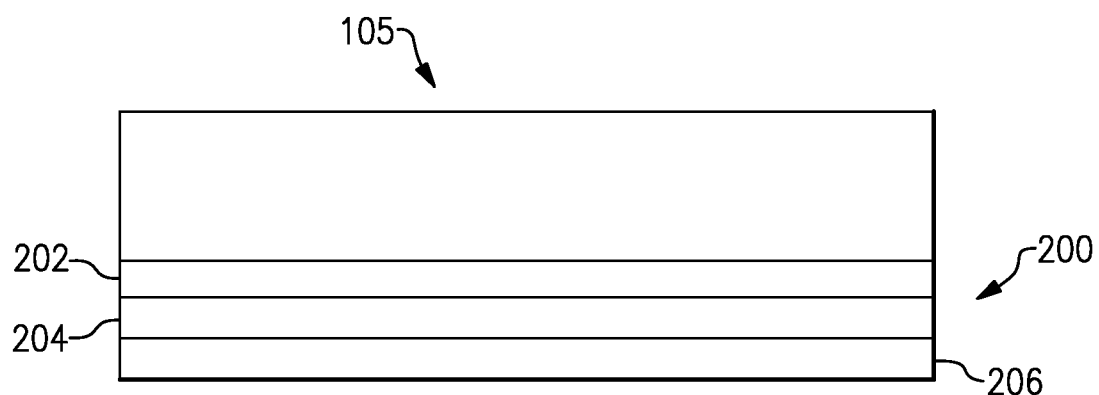
FIG. 3 shows a detail view of a coating shown in FIG. 2.

To that end, a multilayer coating 200, shown in FIGS. 2 and 3, is disposed on the BOAS 105 which has both abradable and CMAS-resistant properties as will be discussed herein.

Disposed directly on the BOAS radially inner face 106 is a bond coat 202. The bond coat may be a silicon dioxide-based bond coat 202. Generally the bond coat is compatible with the material of the BOAS 105 chemically and has similar coefficient of thermal expansion to the BOAS 105.

Disposed on the bond coat 202 is an environmental barrier coating (EBC) 204. EBCs are known in the art and generally include gettering particles and diffusive particles. The gettering particles can react with oxidant particles, such as oxygen or water, that could diffuse into the coating 200. In this way, the gettering particles could reduce the likelihood of those oxidant particles reaching and oxidizing the underlying BOAS 105. The gettering particles thus function as an oxygen and moisture diffusion barrier to limit the exposure of the underlying BOAS 105 to oxygen and/or moisture from the surrounding environment. The EBC 204 may optionally also include diffusive particles. Without being bound by any particular theory, the diffusive particles enhance oxidation and moisture protection by diffusion of some or all of the composition constituents to the outer surface of the EBC 204 and forming a sealing layer that seals the underlying BOAS 105 from oxygen/moisture exposure. Additionally, the diffusive particles may include cationic metal species which can diffuse into the gettering particles to enhance oxidation stability of the gettering particle material. Further, the diffusion behavior of the diffusive particles may operate to seal any microcracks that could form in the EBC 204. Sealing the micro-cracks could prevent oxygen from infiltrating the EBC 204, which further enhances the oxidation resistance of the barrier layer.

The EBC 204 is not reactive with CMAS and dense to avoid water vapor and CMAS glass permeation. In particular, in some examples, the EBC includes at least one refractory metal oxide such as $HfSiO_4$ or $ZrSiO_4$, which are known to limit reactivity of the EBC 204 with CMAS. Without being bound by any particular theory, the constant dissolution of Hf and Zr into CMAS glass promotes re-precipitation of Zircon/Hafnon particles at EBC-relevant operating temperatures.

Disposed on the EBC 204 is a CMAS-transparent porous or columnar abradable layer 206. That is, molten CMAS can move through the abradable layer 206 by infiltrating its pores and dissolving particles without generating instantaneous reactive crystallization. The abradable layer 206 has a higher porosity than the EBC 204. In a particular example, the porosity of the abradable layer 206 is initially (e.g., at the time of application on the EBC 204) between about 15 and 40 percent and the porosity of the EBC 204 is less than about 5 percent. As discussed above, molten CMAS tends to build up on the BOAS and will infiltrate into the pores of the abradable layer 206. Due to capillary action, the CMAS will tend to infiltrate towards the EBC 204 and slowly fill the abradable layer 206 from its interface with the EBC 204 to its outermost surface. Over time, CMAS will reduce the porosity of the abradable layer 206 as it infiltrates the pores, however, because the abradable layer 206 has a high porosity to begin with, it will still maintain its abradable nature and accommodate tip 103 rubbing. It is important to note that the base chemistry of the abradable layer and possible CMAS reaction, dissolution or intrinsic crystallization products should have CTE in the ranges matching of SiC material (difference between CTE mismatch should be less than 50 percent) to minimize stress build up after thermal cycling. Moreover, as noted above in some examples the tip 103 may have an abrasive coating that would mitigate any reduction in abradability of the abradable layer 206.

As CMAS infiltrates into the abradable layer 206, it may have a self-healing effect in that the molten CMAS can fill in any cracks that form in the abradable layer 206. The CMAS will eventually recrystallize and become part of the abradable layer 206. In this way, absorption of the CMAS by the abradable layer 206 mitigates the CMAS from having unwanted interactions with the EBC 204, which as discussed above improves the longevity of the coating 200 and BOAS 105. Therefore, the coating 200 accommodates CMAS infiltration into the abradable layer 206, and mitigates the deleterious effects of CMAS, while still providing an abradable surface for the BOAS 105, and protecting the underlying layers and BOAS 105 from the CMAS.

In one example the abradable layer 206 includes at least one rare earth silicates, alkaline earth silicates, alkaline earth aluminosilicates, rare earth aluminates, garnets, spinels, rare earth phosphates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

As used herein, the term "about" and "approximately" have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A blade outer air seal, comprising:
   a center web having a radially inner face and a radially outer face;
   at least one mounting arm extending from the radially outer face; and
   a coating disposed on the radially inner face, the coating including:
      an environmental barrier coating layer, and
      an abradable layer disposed on the environmental barrier layer, the abradable layer having a porosity of between about 15 percent and about 40 percent,
   wherein the abradable layer comprises silicon oxycarbides.

2. The blade outer air seal of claim 1, wherein the environmental barrier coating is nonreactive with respect to calcia-magnesia-alumino-silicate (CMAS).

3. The blade outer air seal of claim 2, wherein the environmental barrier coating layer includes at least one refractory metal oxide, and wherein the refractory metal oxide is at least one of HfSiO4 and ZrSiO4.

4. The blade outer air seal of claim 1, wherein pores of the abradable layer are configured to receive molten calcia-magnesia-alumino-silicate (CMAS).

5. The blade outer air seal of claim 1, wherein the abradable layer includes alkaline earth silicates or alkaline earth aluminosilicates.

6. The blade outer air seal of claim 1, wherein the abradable layer includes yttria-stabilized zirconia or alumina-stabilized zirconia.

7. The blade outer air seal of claim 1, wherein the abradable layer includes silicon, silicon oxides, or silicon carbides.

8. The blade outer air seal of claim 1, wherein the abradable layer includes mullite.

9. The blade outer air seal of claim 1, wherein the abradable layer includes titania.

10. The blade outer air seal of claim 1, wherein the abradable layer includes chromia.

11. The blade outer air seal of claim 1, wherein the abradable layer includes barium-magnesium aluminosilicate.

12. The blade outer air seal of claim 1, wherein the abradable layer includes hafnium silicon oxides.

13. The blade outer air seal of claim 1, wherein the abradable layer includes alumina-stabilized zirconia.

14. The blade outer air seal of claim 1, wherein the abradable layer includes yttria.

15. A gas turbine engine, comprising:
   a turbine section arranged along a central engine axis, the turbine section having a turbine with at least one blade rotatable around the central engine axis, the at least one blade having a tip; and
   at least one blade outer air seal arranged radially outward from the tip and attached to an engine static structure, the blade outer air seal including:
      a center web having a radially inner face and a radially outer face;
      at least one mounting arm extending from the radially outer face, and
      a coating disposed on the radially inner face, the coating including:
         an environmental barrier coating layer, and
         an abradable layer disposed on the environmental barrier layer, wherein the abradable layer has pores and calcia-magnesia-alumino-silicate (CMAS) is disposed in at least some of the pores,
   wherein the abradable layer comprises silicon oxycarbides.

16. The gas turbine engine of claim 15, wherein the environmental barrier coating is nonreactive with respect to calcia-magnesia-alumino-silicate (CMAS), and wherein the environmental barrier coating layer includes at least one refractory metal oxide, and the refractory metal oxide is at least one of HfSiO4 and ZrSiO4.

17. A method of protecting a blade outer air seal, comprising:
   on a radially inner face of a blade outer air seal, applying a coating, the coating including:
      an environmental barrier coating layer, and
      an abradable layer the abradable layer having a porosity of between about 15 percent and about 40 percent, wherein pores of the abradable layer are configured to receive molten calcia-magnesia-alumino-silicate (CMAS),
   wherein the abradable layer comprises silicon oxycarbides.

18. The method of claim 17, wherein the environmental barrier coating is nonreactive with respect to calcia-magnesia-alumino-silicate (CMAS).

19. The method of claim 18, wherein the environmental barrier coating layer includes at least one refractory metal oxide.

20. The method of claim 19, wherein the refractory metal oxide is at least one of HfSiO4 and ZrSiO4.

* * * * *